July 19, 1955 — I. HERBST — 2,713,493
HYDRAULIC CHUCK
Filed Oct. 20, 1951 — 2 Sheets-Sheet 1

INVENTOR.
Irvin Herbst
BY

United States Patent Office 2,713,493
Patented July 19, 1955

2,713,493

HYDRAULIC CHUCK

Irvin Herbst, Cincinnati, Ohio, assignor to American Steel Foundries, Chicago, Ill., a corporation of New Jersey Application October 20, 1951, Serial No. 252,329

15 Claims. (Cl. 279—4)

This invention relates to hydraulic chucks and is more particularly concerned with the provision of a chuck adapted for use on vertical boring and turning machines.

Briefly, the present invention contemplates the provision of a vertical boring and turning machine provided with a table journaled for rotational movement in a suitable base and having a plurality of radially movable chuck jaws. The chuck jaws are provided with individual bell crank levers mounted for pivotal movement upon the table, one end of each lever engaging its respective jaw and the other end of each lever being engaged within an annular recess provided in an actuating sleeve. The actuating sleeve is mounted for axial movement within a table supporting spindle journaled in the base of the machine and is reciprocated by a piston acting through a piston rod. The piston rod is journaled at its upper end in the actuating sleeve and extends axially through the spindle below the lower end of the latter. A piston is secured to the lower end of the piston rod and is enclosed within a cylinder mounted in fixed position upon the base. A pair of antifriction bearings are interposed between the actuating sleeve and the upper end of the connecting rod to carry the thrust load during either external or internal clamping engagement of articles to be machined. A ring bevel gear is secured to the spindle adjacent the underside of the table and by screws through the table for meshing engagement with a driving bevel gear keyed on a driving shaft connected to a suitable source of power.

The present invention contemplates the provision of an hydraulic chuck embodying antifriction bearings disposed between a non-rotatable piston rod and a rotatable chuck jaw actuating sleeve to carry thrust loads during internal or external clamping operation of the chuck jaws.

It is a further object of this invention to provide an hydraulic chuck embodying a cylinder adapted to be secured in fixed position to the base of a machine to permit oil conduits to be directly connected to the cylinder. In other types of hydraulic chucks, it has been the practice to mount the operating cylinder for common rotational movement with the chuck, thus necessitating the employment of relatively movable parts for making a fluid connection between the oil conduits and the cylinder.

The present invention further contemplates an hydraulic chuck embodying a construction and arrangement of parts in which the operating cylinder employed to actuate the chuck jaws is not limited in size, thus permitting operation of the chuck at relatively low unit pressures.

This invention further contemplates the provision of an hydraulic chuck construction which is relatively simple and inexpensive to manufacture and which will not readily get out of order.

This invention embodies other novel features, details of construction and arrangement of parts which are hereinafter set forth in the specification and claims and illustrated in the accompanying drawings, wherein:

Figure 1:
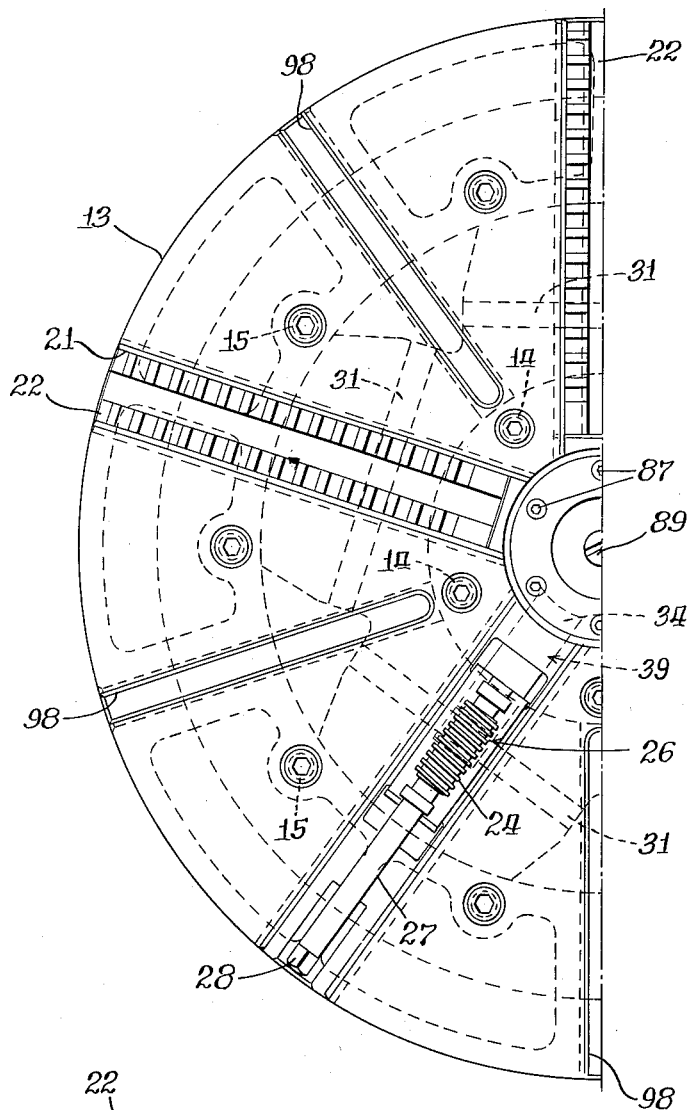
Figure 1 is a top plan view illustrating a five jaw hydraulic chuck embodying features of the present invention, only half of the chuck being shown as it is symmetrical about its center line, and one chuck jaw being removed to illustrate the underlying parts.
Figure 3:
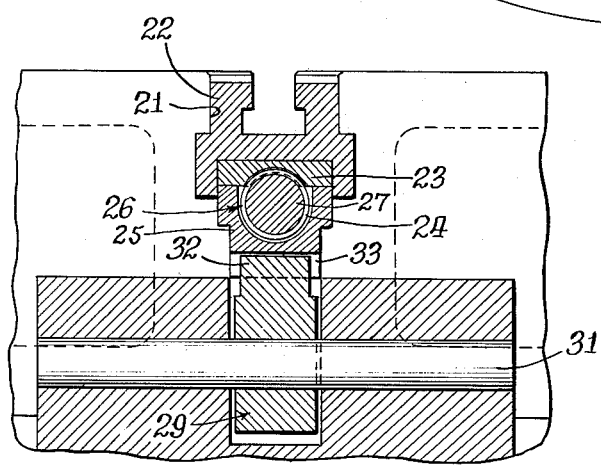
Figure 3 is an enlarged sectional view taken along the line 3—3 of Figure 2.
Figure 2:
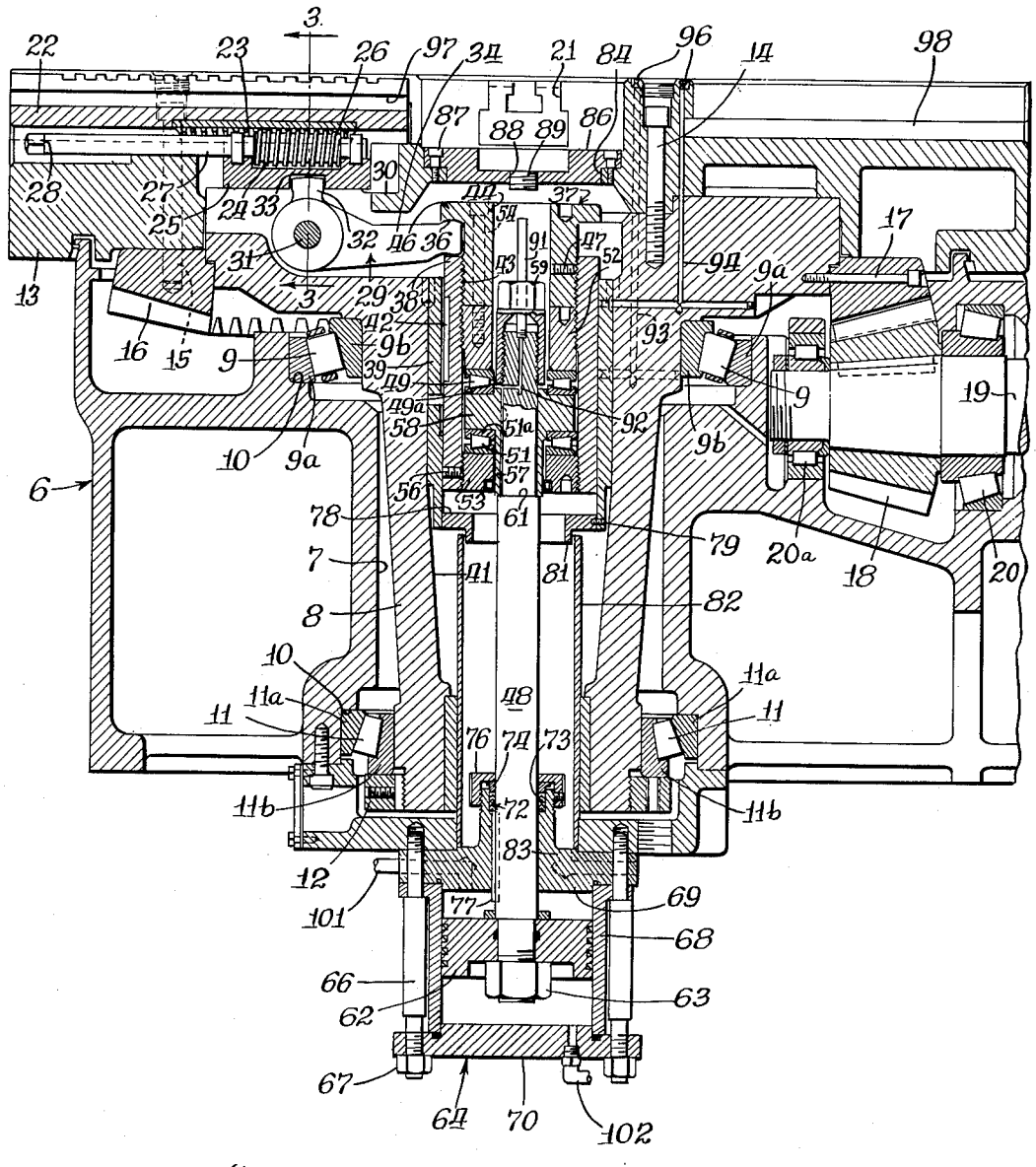
Figure 2 is a vertical sectional view of the same.

Referring now to the drawings for a better understanding of the present invention, the hydraulic chuck is shown as embodying a vertical boring and turning machine having a base 6 formed with a vertical opening 7 to receive a spindle 8. The spindle is journaled for rotational and non-axial movement within the opening 7 by means of antifriction bearings 9 and 11 having their outer races 9a and 11a engaged against oppositely facing shoulders 10 formed on the base, the spindle being secured in assembled position on the base by means of a nut 12 threaded onto the lower end of the spindle for engagement against the inner race 11b of the anti-friction bearing 11. An annular table 13 is concentrically positioned upon the upper end of the spindle 8 and secured thereto by means of a plurality of circumferentially spaced cap screws 14. A ring bevel gear 16 is secured to the upper end of the spindle 8 by means of cap screws 17 and by screws 15 through the table for meshing engagement with a bevel gear 18 keyed to a driving shaft 19, the gear being disposed in abutting engagement against the lower face of the table 13. The driving shaft is journaled in antifriction bearings 20 and 20a mounted in the machine base 6 and is driven from any suitable source of power (not shown).

The table 13 is formed with a plurality of radially disposed T slots 21 to slidably receive chuck jaws 22, the inner face of each jaw 22 being provided with concave thread segments 23 for engagement with threads 24 of a worm 26 formed on a shaft 27. The shafts 27 are journaled for rotational and non-axial movement in suitable bearings provided in bearing blocks 25 disposed under their respective chuck jaws 22, the shafts extending radially from the axis of rotation of the table 13 and parallel with their respective jaws. The outer end of each shaft 27 is formed noncircular at 28 to receive a suitable socket wrench (not shown) employed to adjust the positions of the chuck jaws relative to each other and to the axis of rotation of the table 13. The bearing blocks 25 are mounted for reciprocative movement in radially disposed slots 30 formed in the upper surface of the table 13 below their respective jaws 22.

A plurality of bell crank levers 29 are pivotally mounted on pivot pins 31 disposed transversely to the axis of rotation of the spindle 8, the ends of the pins being mounted on the spindle. Each lever is formed with a short arm 32 and a long arm 34, the short arm being engaged within a recess 33 formed in the lower face of its respective bearing block 25 and the long arm extending radially toward the axis of the spindle for engagement within an annular recess 36 provided on an actuating sleeve 37.

The actuating sleeve 37 is shown as comprising an outer sleeve 38 mounted for reciprocative movement within a bearing 39 secured within the axial bore 41 of the spindle 8, the outer sleeve being engaged against rotational movement relative to the bearing by means of a key 42. The outer sleeve 38 is internally threaded at 43 to receive an externally threaded inner sleeve 44 formed with an annular flange 46 disposed in spaced relation to the upper end of the outer sleeve to define therewith the annular recess 36. The inner and outer sleeves are secured against relative rotational movement by a set screw 47.

The upper end of a piston rod 48 is engaged within the actuating sleeve 37 for rotational and non-axial movement relative thereto by means of a pair of antifriction thrust bearings 49 and 51 engaged between a pair of apertured plugs 52 and 53 threaded into opposite ends of the outer sleeve 38, the plug 52 being secured to the inner sleeve 44 by a cap screw 54 and the plug 53 being secured to the outer sleeve 38 by a set screw 56. A thrust collar 57 is keyed to the upper end of the piston rod 48 and is formed with an annular flange 58 for engagement by and between adjacent races 49a and 51a of the thrust bearings 49 and 51, respectively. A nut 59 is threaded onto the upper end of the piston rod to tightly engage the collar 57 against an abutment shoulder 61.

A piston 62 is secured to the lower end of the piston rod 48 by means of a nut 63 and is enclosed within a cylinder 64 secured to the base 6 by a plurality of circumferentially spaced studs 66 and nuts 67. The cylinder is shown as comprising a tubular side wall 68 and end walls 69 and 70, the end wall 69 being provided with a stuffing box 72 enclosing the piston rod 48. The stuffing box is filled with a suitable packing material 73 compressed into sealing engagement with the piston rod by means of a gland 74 and gland nut 76. The piston rod 48 is mounted for axial movement through the end wall 69 and is engaged against relative rotational movement by a key 77.

An apertured end plate 78 is secured within the lower end of the bearing 39 by screws 79 and is formed with an annular flange 81 projecting downwardly into the upper end of a tubular casing 82 which is secured at its lower end within an aperture formed in the base 6. The end wall 69 is formed with a passage 83 leading from the interior of the casing 82 to the atmosphere.

The table 13 is formed with a central opening 84 which is normally closed by a cap 86 secured to the table by cap screws 87, the cap being formed with a threaded aperture 88 to receive a plug 89 adapted to be removed to permit access to a lubricant fitting 91 threaded into the upper end of the piston rod 48 and communicating with a lubricant passage 92 leading to the upper thrust bearing 49 and thence around the thrust collar flange 58 to the lower thrust bearing 51. Lubricant is directed onto the inner surface of the bearing 39 through passageways 93 and 94 provided with suitable lubricant fittings 96.

The upper faces of the jaws 22 are serrated and formed with T slots 97 to receive conventional adapters (not shown) to engage internal or external surfaces of articles to be machined, and the upper face of the table 13 is preferably formed with radially disposed T slots 98 spaced between the jaws.

In the operation of the hydraulic chuck thus shown and described, fluid under pressure is directed into upper end of the cylinder through the conduit 101 to actuate the piston 62 and move the chuck jaws 22 inwardly toward the axis of the table 13. The jaws are moved toward the periphery of the table 13 by directing fluid under pressure into the lower end of the cylinder through the conduit 102. After an article has been engaged between the jaws 22, a suitable source of power is adapted to act through the driving shaft 19, driving gear 18, and ring gear 16 to rotate the table 13. During rotational movement of the table 13, spindle 8 and actuating sleeve 37, it will be noted that the piston rod, thrust collar 57, piston 62 and cylinder 64 are stationary as they are keyed against movement relative to the base 6. It will further be noted that the antifriction bearings 49 and 51 carry the thrust load during both internal and external clamping engagement of work by the chuck jaws and during rotation of the table 13 in machining the work. It will also be noted that the cylinder 64 may be of any suitable diameter to employ the use of relatively low unit pressures.

I claim:

1. In a hydraulic chuck, a base, a work supporting head mounted for rotational and nonaxial movement in said base and formed with an axial opening and a plurality of radially disposed slots, jaws slidably mounted in said slots, bell crank levers pivotally mounted in said head and operatively connected to said jaws, a cylindrical actuating sleeve mounted in said opening for axial and nonrotational movement relative to said head and engaging said levers, a solid piston rod disposed in said opening and sleeve and having one of its ends connected to said sleeve for relative rotational and nonaxial movement, and means to reciprocate said rod to move said jaws.

2. In a hydraulic chuck, a base, a work supporting head mounted for rotational and nonaxial movement in said base and formed with an axial opening and a plurality of radially disposed slots, jaws slidably mounted in said slots, bell crank levers pivotally mounted on said head and operatively connected to said jaws, a cylindrical actuating sleeve mounted in said opening for axial and nonrotational movement relative to said head and engaging said levers, a solid piston rod disposed in said opening and sleeve and having one of its ends connected to said sleeve for relative rotational and nonaxial movement, and means to reciprocate said rod to move said jaws, said piston rod mounted for axial and nonrotational movement relative to said base.

3. In a hydraulic chuck, a base, a work supporting head mounted for rotational and nonaxial movement on said base and formed with an axial opening and a plurality of radially disposed slots, jaws slidably mounted in said slots, bell crank levers pivotally mounted on said head and operatively connected to said jaws, a cylindrical actuating sleeve mounted in said opening for axial and nonrotational movement relative to said head and engaging said levers, a solid piston rod disposed in said opening and sleeve and having one of its ends connected to said sleeve for relative rotational and nonaxial movement, means to reciprocate said rod to move said jaws, said piston rod mounted for axial and nonrotational movement relative to said base, and antifriction thrust bearings interposed between said sleeve and rod to carry thrust loads.

4. In a hydraulic chuck, a base, a work supporting head mounted for rotational and nonaxial movement on said base and formed with an axial opening and a plurality of radially disposed slots, jaws slidably mounted in said slots, bell crank levers pivotally mounted on said head and operatively connected to said jaws, a cylindrical actuating sleeve mounted in said opening for axial and nonrotational movement relative to said head and engaging said levers, a solid piston rod disposed in said opening and sleeve and having one of its ends connected to said sleeve for relative rotational and nonaxial movement, a piston secured on the other end of said rod, a cylinder enclosing said piston and fixed to said base externally thereof, and means to engage said rod against rotation relative to said base.

5. In a hydraulic chuck, a base, a work supporting head mounted for rotational and nonaxial movement on said base and formed with an axial opening and a plurality of radially disposed slots, jaws slidably mounted in said slots, bell crank levers pivotally mounted on said head and operatively connected to said jaws, a cylindrical actuating sleeve mounted in said opening for axial and nonrotational movement relative to said head and engaging said levers, a solid piston rod disposed in said opening and sleeve and having one of its ends connected to said sleeve for relative rotational and nonaxial movement, a piston secured on the other end of said rod, a cylinder enclosing said piston and fixed to said base externally thereof, means to engage said rod against rotation relative to said base, and conduits directly connected to said cylinder.

6. A chuck including a work supporting head journaled for rotation in a base, jaws mounted for radial movement on said head, means to move said jaws including a cylindrical actuating sleeve mounted on said head for relative axial and nonrotational movement therewith, a pair of spaced antifriction bearings mounted within said sleeve, a solid rod arranged for rotational movement relative to the head and having a cylindrical annular flange engaged between said bearings, and means to reciprocate said rod.

7. A chuck including a work supporting head journaled for rotation in a base, jaws mounted for radial movement on said head, means to move said jaws including a cylindrical actuating sleeve mounted on said head for relative axial and nonrotational movement therewith, a pair of spaced antifriction bearings mounted within said sleeve, a solid rod arranged for rotational movement relative to the head and having an annular flange engaged between said bearings, means to reciprocate said rod, and means engaging said rod against rotation relative to said base.

8. A chuck including a work supporting head journaled for rotation in a base, jaws mounted for radial movement on said head, means to move said jaws including a cylindrical actuating sleeve mounted on said head for relative axial and nonrotational movement therewith, a pair of spaced antifriction bearings mounted within said sleeve, a solid rod arranged for rotational movement relative to the head and having an annular flange engaged between said bearings, and means mounted externally of said base and including a piston and cylinder to reciprocate said rod.

9. A chuck including a work supporting head journaled for rotation in a base, jaws mounted for radial movement on said head, means to move said jaws including a cylindrical actuating sleeve mounted on said head for relative axial and nonrotational movement therewith, a pair of spaced antifriction bearings mounted within said sleeve, a solid rod arranged for rotational movement relative to the head and having an annular flange engaged between said bearings, means mounted externally of said base and including a piston and cylinder to reciprocate said rod, and means engaging said rod and cylinder against rotation relative to said base.

10. In a hydraulic chuck, a base, a work supporting head mounted for rotational and nonaxial movement on said base and formed with an axial opening and a plurality of radially disposed slots, jaws slidably mounted in said slots, bell crank levers pivotally mounted on said head and operatively connected to said jaws, a cylindrical actuating sleeve mounted in said opening for axial and nonrotational movement relative to said head and engaging said levers, a solid piston rod disposed in said opening and sleeve and having one of its ends connected to said sleeve for relative rotational and nonaxial movement, means mounted externally of said base to reciprocate said rod to move said jaws, and manually operable means to move each jaw relative to a companion jaw.

11. In a hydraulic chuck, a base, a work supporting head mounted for rotational and nonaxial movement on said base and formed with an axial opening and a plurality of radially disposed slots, jaws slidably mounted in said slots, bell crank levers pivotally mounted on said head and operatively connected to said jaws, a cylindrical actuating sleeve mounted in said opening for axial and nonrotational movement relative to said head and engaging said levers, a solid piston rod disposed in said opening and sleeve and having one of its ends connected to said sleeve for relative rotational and nonaxial movement, means mounted externally of said base to reciprocate said rod to move said jaws, and manually operable means including a worm journaled on the head to move each jaw relative to a companion jaw.

12. In a boring and turning machine, a base, a spindle journaled in said base, a table secured on said spindle, jaws mounted for radial movement on said table, said spindle and table having an axial opening to engage a cylindrical jaw actuating sleeve for relative axial movement and common rotational movement, means responsive to axial movement of said sleeve to move said jaws, a solid rod disposed for axial movement in said opening and engaged against rotational movement relative to said base, thrust means connecting said rod and sleeve internally of the latter for common axial movement and relative rotational movement, means engaging said rod against rotation relative to said base, and means to rotate said spindle.

13. In a boring and turning machine, a base, a spindle journaled in said base, a table secured on said spindle, jaws mounted for radial movement on said table, said spindle and table having an axial opening to engage a cylindrical jaw actuating sleeve for relative axial movement and common rotational movement, means responsive to axial movement of said sleeve to move said jaws, a solid rod disposed for axial movement in said opening and engaged against rotational movement relative to said base, thrust means connecting said rod and sleeve internally of the latter for common axial movement and relative rotational movement, means engaging said rod against rotation relative to said base, means to rotate said spindle, and means mounted externally of said base to reciprocate said rod.

14. In a boring and turning machine, a base, a spindle journaled in said base, a table secured on said spindle, jaws mounted for radial movement on said table, said spindle and table having an axial opening to engage a cylindrical jaw actuating sleeve for relative axial movement and common rotational movement, means responsive to axial movement of said sleeve to move said jaws, a solid rod disposed for axial movement in said opening and engaged against rotational movement relative to said base, thrust means connecting said rod and sleeve internally of the latter for common axial movement and relative rotational movement, means engaging said rod against rotation relative to said base, means to rotate said spindle, and means to reciprocate said rod including a cylinder bolted to said base externally thereof and a piston secured on said rod.

15. In a boring and turning machine, a base, a spindle journaled in said base, a table secured on said spindle, jaws mounted for radial movement on said table, said spindle and table having an axial opening to engage a cylindrical jaw actuating sleeve for relative axial movement and common rotational movement, means operable responsive to axial movement of said sleeve to move said jaws, a solid rod disposed for axial movement in said opening and engaged against rotational movement relative to said base, thrust means connecting said rod and sleeve internally of the latter for common axial movement and relative rotational movement, means engaging said rod against rotation relative to said base, means to rotate said spindle, means to reciprocate said rod including a cylinder bolted to said base externally thereof and a piston secured on said rod, said thrust means including a thrust collar, and a pair of antifriction bearings engaged against opposite sides of said collar.

References Cited in the file of this patent

UNITED STATES PATENTS

| | | |
|---|---|---|
| 806,168 | Morrison | Dec. 5, 1905 |
| 1,454,121 | Lavoie | May 8, 1923 |
| 1,455,351 | Olson | May 15, 1923 |
| 1,869,445 | Tomkins | Aug. 2, 1932 |
| 1,968,700 | Milotta | July 31, 1934 |
| 2,224,639 | Ward | Dec. 10, 1940 |
| 2,546,326 | Wetzel | Mar. 27, 1951 |
| 2,568,092 | Sloan et al. | Sept. 18, 1951 |